H. C. JONES.
HOSE CLAMP.
APPLICATION FILED MAR. 3, 1917.
1,236,312.
Patented Aug. 7, 1917.
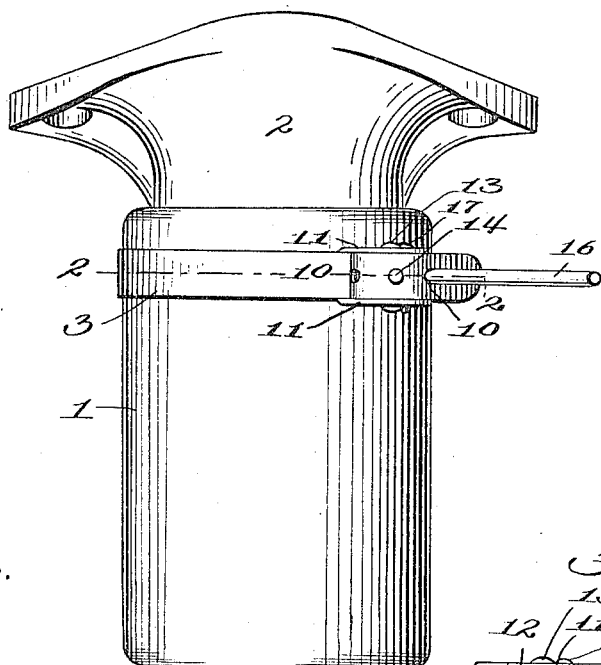
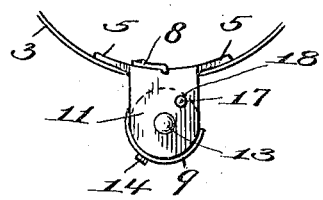
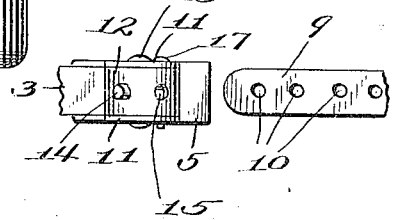
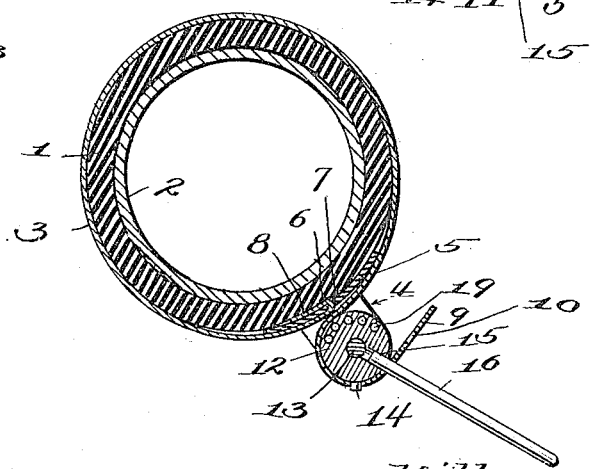
Inventor
Hilles C. Jones
By
Attorney
Witness

UNITED STATES PATENT OFFICE.

HILLES C. JONES, OF ALLENTOWN, NEW JERSEY.

HOSE-CLAMP.

1,236,312.  Specification of Letters Patent.  Patented Aug. 7, 1917.

Application filed March 3, 1917. Serial No. 152,323.

*To all whom it may concern:*

Be it known that I, HILLES C. JONES, a citizen of the United States, residing at Allentown, in the county of Monmouth and State of New Jersey, have invented new and useful Improvements in Hose-Clamps, of which the following is a specification.

The present invention relates to improvements in hose clamps, and more especially to those of the type adapted for use on automobiles for fastening and securing a watertight fit of the hose connections between the radiator and engine and other parts of the water-circulating system.

The primary objects of the invention are to provide an improved hose clamp which is capable of use on hose of different sizes; to provide a clamp which can be applied easily and tightened with facility, especially in those cases where the clamp is located in a relatively inaccessible position; to provide a clamp which can be easily manipulated to subject the hose to a firm compression which is distributed evenly and completely around the circumference of the hose, thereby preventing water leakage, a simple and efficient device being provided for locking the clamp when tightened; and to provide a hose clamp which can be manufactured at small cost.

To these and other ends, the invention consists in certain improvements, and combinations and arrangements of parts, all as will be hereinafter more fully described, the novel features being pointed out particularly in the claims at the end of the specification.

In the accompanying drawing:

Figure 1 shows a hose connection of a type used on automobiles and equipped with a clamp constructed in accordance with the present invention.

Fig. 2 represents a section taken on the line 2—2 of Fig. 1.

Fig. 3 is a detail view of a portion of the clamp showing the same in locked condition; and Fig. 4 shows the two terminals of the clamp in separated relation.

Similar parts are designated by the same reference characters in the several views.

Hose clamps embodying the present invention may be used in all instances where it is desirable or necessary to clamp hose upon a nipple, fitting or other part, although it is especially applicable to the hose connections used in the water-circulating systems of automobiles, as it meets the conditions peculiar to such uses. The preferred construction is shown in the accompanying drawing and will be hereinafter described in detail. It is to be understood, however, that the invention is not restricted to the precise construction shown, as equivalent constructions are contemplated and will be included within the scope of the claims.

In the drawing, 1 designates a hose connection and 2 designates a nipple or fitting to which the hose connection is to be attached. It is common to employ such fittings and hose connections in the water-circulating systems of automobiles in order to connect the water jacket of the engine to the radiator. The hose clamp provided by the present invention comprises a flexible band or strap 3 and a tightening and locking device 4 which coöperates with the ends of the band. The band may be composed of a strip of flexible or bendable sheet metal of suitable kind, thickness and width, a thin strip of brass being preferably used, and the band is preferably of a length sufficient to encircle the largest of the commonly used sizes of hose. The tightening and locking device comprises a clip or bracket having a segmental base 5 which conforms substantially in contour to the curvature of the hose, and one end of the band is fastened to the clip. As shown, the fastened end 6 of the band is extended through an opening 7 in the base 5 of the clip and it is doubled, as at 8, to form a hook, the doubled portion of the band being permanently secured to the base of the clip by solder, rivets or other suitable means. The other or free end 9 of the band is formed with a suitable number of holes 10 which have a predetermined spacing, as will hereinafter appear. The clip is provided with a pair of outwardly projecting ears or side walls 11, and a drum 12 is rotatably mounted between these ears, it being rotatably supported in the present instance by a stud 13 which extends axially through the drum 12 to serve as a journal for the drum, and the ends of the stud are upset or headed to secure it in the side walls 11. The drum 12, which is preferably in the form of a cylinder having its circumference concentric with the stud 13, is spaced from the base 5 of the clip a distance sufficient to permit the free end of the band to be inserted between the drum and the base of the clip, and the drum is preferably of a width corresponding to the width of the band. A projection 14 is provided on the periphery of the drum, and this projection is adapted to fit into any one of the holes 10 in the free end of the band. The drum is also provided with a bore 15 which preferably extends radially thereof, and the circumferential distance between the projection 14 and the bore 15 corresponds to the longitudinal spacing of the holes 10 in the free end of the band. This construction enables the free end of the band to be wrapped about the drum so as to bring one of the holes 10 into a position to be engaged by the projection 14, while the next hole toward the end of the band will register with the bore 15 of the drum, thus enabling a pin or bar 16 to be inserted through the hole in the band and into the bore 15 in the drum to serve as a lever to rotate the drum and thereby tighten the band about the hose. The pin or bar 16 by coöperating with the band in this way will assist the projection 14 in applying tension to the band during tightening thereof. Locking of the band after it has been tightened is effected by a pin 17 which is adapted to be inserted through registering holes 18 in the side walls 11 and through one of the holes 19 which extends through the drum 12, there being a number of these holes 19 formed in the drum, any one of which may register with the holes 18 in the side walls of the clip when the band has been tightened to the proper degree.

In applying a hose clamp constructed in accordance with the present invention to a hose connection, the flexible band or strap is passed around the hose connection at the point where it fits over the nipple or fitting to which it is attached, and the free end of the band is inserted through the space between the drum and base of the clip and then drawn around the drum, the projection 14 in the periphery of the drum being engaged with one of the holes 10 in the free end of the band. The pin 16 is then inserted through the adjacent hole in the band toward the free end thereof and into the bore 15 of the drum, and the pin 16 is then moved as a lever in a direction to cause winding of the free end of the band upon the drum, the drum acting as a capstan. This operation subjects the band to a tension, and the tension of the band exerts a compression upon the hose, this compression being distributed evenly and completely around the hose. When the band has been tightened sufficiently, the pin 17 is passed through the holes 18 in the side walls of the clip and through the particular hole 19 in the drum which happens to register with the holes 18. The pin 17 will then lock the drum from reverse rotation, and hence unwinding of the band is prevented, with the result that the band is maintained at the proper tension. After the locking pin 17 has been inserted, the pin or lever 16 is removed and, if desired, the projecting part of the free end of the band may be cut off.

I claim as my invention:—

1. A hose clamp comprising a band having a clip attached to one end thereof and having a hole in its opposite end, a drum rotatably mounted on said clip and having a projection on its periphery to engage in said hole in the band and adapted to tension the band when the drum is rotated, and means for locking the drum from rotation.

2. A hose clamp comprising a band to encircle the hose and a tightening device for the band embodying a member attached to one end of the band, a drum rotatably mounted on said member and having a projection on its periphery to coöperate with a hole in the other end of the band, and means to lock the drum from rotation relatively to said member.

3. A hose clamp comprising a band having a hole in one end thereof, a clip attached to the other end of the band, a drum rotatably mounted on the clip and having a space between its periphery and the attached end of the band for the insertion therethrough of the unattached end of the band, the drum having a projection on its periphery to engage in the hole in the band and operative to tension the band when the drum is rotated, and means for non-rotatably locking the drum.

4. A hose clamp comprising a band adapted to encircle the hose and having a plurality of longitudinally spaced holes in one end, a clip attached to the opposite end of the band, and a drum rotatably mounted on the clip and having a projection on its periphery to engage in one of the holes in the band and also having a bore extending inwardly from its periphery, said bore being spaced circumferentially from said projection for a distance equal to the space between adjacent holes in the band.

5. A hose clamp comprising a band to encircle the hose, a clip attached to one end of the band, the clip having a pair of oppositely located side walls, a drum rotatably mounted in said clip between the side walls thereof and adapted to coöperate with the unattached end of the band to tension the latter when the drum is rotated, the side walls of the clip having registering holes and the drum having a hole adapted to register with the holes of the clip when the drum is rotated, and a locking pin adapted to be inserted in said holes of the clip and drum.

In testimony whereof I have hereunto set my hand in presence of two subscribing witnesses.

HILLES C. JONES.

Witnesses:
 ALICE M. FRAZEE,
 GORDON D. FRAZEE.

Copies of this patent may be obtained for five cents each, by addressing the "Commissioner of Patents, Washington, D. C."